United States Patent [19]
Ellmann et al.

[11] Patent Number: 5,764,050
[45] Date of Patent: Jun. 9, 1998

[54] METHOD FOR THE RELIABLE DETERMINATION OF THE DISTANCE OF THE CONDUCTIVE REACTION TRACK FROM A FUNCTIONAL SURFACE OF A MAGNETIC LEVITATION VEHICLE MOVING RELATIVE TO THE REACTION TRACK AND A SENSOR FOR PERFORMING THE METHOD

[75] Inventors: Siegfried Ellmann, Ascheim; Joachim Klesing, München; Michael Ruppert, Taufkirchen; Josef Eder, Karlsfeld, all of Germany

[73] Assignee: Thyssen Industrie AG, Essen, Germany

[21] Appl. No.: 680,221

[22] Filed: Jul. 11, 1996

[30] Foreign Application Priority Data

Jul. 12, 1995 [DE] Germany .................. 195 25 131.8

[51] Int. Cl.⁶ ........................ G01B 7/14; B60L 13/06; F16C 32/04
[52] U.S. Cl. ........................ 324/207.16; 324/207.24; 324/232; 324/236; 104/284
[58] Field of Search .................... 324/207.16, 207.22, 324/207.24, 228, 232, 236; 104/284

[56] References Cited

U.S. PATENT DOCUMENTS

4,812,757  3/1989  Meins et al. .................. 324/207.17

FOREIGN PATENT DOCUMENTS

3409448  9/1984  Germany .
3516036  11/1986  Germany .
4302399  3/1994  Germany .

*Primary Examiner*—Walter E. Snow
*Attorney, Agent, or Firm*—Robert W. Becker & Associates

[57] ABSTRACT

In a method for measuring a distance between a conducting reaction track and a functional surface moving relative to the reaction track a sensor with two signal transmitters is provided on the functional surface. An alternating field is generated in the sensor. The alternating field changes as a function of the distance between the conducting reaction track and the functional surface. Each of the two signal transmitters detects the changes of the alternating field as distance information. Each signal transmitter produces decoupled distance information values. These decoupled distance information values are processed in separate distance measuring channels to provide processed signals. The processed signals are constantly fed to and compared in a comparator. A distance information signal is emitted only when the processed signals of the separate distance measuring channels are identical within a predetermined tolerance range.

12 Claims, 4 Drawing Sheets

METHOD FOR THE RELIABLE DETERMINATION OF THE DISTANCE OF THE CONDUCTIVE REACTION TRACK FROM A FUNCTIONAL SURFACE OF A MAGNETIC LEVITATION VEHICLE MOVING RELATIVE TO THE REACTION TRACK AND A SENSOR FOR PERFORMING THE METHOD

BACKGROUND OF THE INVENTION

The present invention relates to a method for securely determining the distance of a conductive reaction track, having profilings extending especially in the direction of the distance determination, relative to a functional surface moving relative to the reaction track wherein the functional surface supports a sensor in which an alternating field is generated that is subject to changes according to distance changes and wherein a signal transmitter of the sensor detects the distance information. The method is used preferably for determining the distance of a magnetic levitation vehicle from the track.

Furthermore, the invention relates to a sensor for detecting movement parameters of a functional surface supporting the sensor relative to a preferably profiled reaction track. The sensor comprises a measuring coil for determining the distance to the reaction track which coil is supplied with alternating current by an alternating current generator so that an alternating field is generated therein which changes as a function of the distance to the reaction track. The sensor is especially suitable for use in connection with the measuring method of the present invention.

Such distance measuring systems are especially important when an object is moved at a defined distance along another object at a high velocity, as, for example, a magnetic levitation train relative to its track.

From German Patent 34 09 448 a device for determining the distance of an electrically conducting reaction track from a sensor comprising a coil system is known. The coil system comprises two coils which are coupled by capacitors operated in parallel or serial connection and which are positioned with opposite coil orientation relative to one another and connected relative to one another such that the electrical fields generated by the coils and acting on the coils are compensated in sum total. The device can be used with high frequencies and is insensitive relative to external electrical fields, potential fluctuations or system-caused magnetic fields. However, there is no monitoring of the correct functioning of the sensors during operation.

A reliable monitoring of the sensor function is the object of the technical solution represented in German Patent 35 16 036. This document discloses a distance measuring device which operates with two coils, i.e., a measuring coil and a reference coil, which are switched such that in the operational state of monitoring a signal is emitted by both coils which is independent of the distance. However, with such an arrangement, the distance signal does not remain unaffected by the special monitoring of the sensor function.

It is therefore an object of the present invention to provide a method for measuring distances of the aforementioned kind with which the significance check of the measured parameter does not affect the measured value and allows for a safe interpretation with regard to the correct value of the measured parameter. A further object of the present invention is to provide a sensor to be used for distance determination especially relative to a profiled reaction track.

SUMMARY OF THE INVENTION

The method for measuring a distance between a conducting reaction track and a functional surface moving relative to the reaction track according to the present invention is primarily characterized by:

Providing a sensor with two signal transmitters on the functional surface;

Generating an alternating field in the sensor, the alternating field changing as a function of the distance between the conducting reaction track and the functional surface;

Detecting with each one of the two signal transmitters the changing of the alternating field as distance information;

Producing in each of the two signal transmitters decoupled distance information values;

Processing the decoupled distance information values in separate distance measuring channels to provide processed signals;

Constantly feeding the processed signals to a comparator;

Comparing the processed signals in the comparator;

The comparator emitting a distance information signal only when the process signals of the separate distance measuring channels are identical within a predetermined tolerance range.

Preferably, the method further comprises the step of supplying each one of the two signal transmitters with alternating current of a different preset frequency.

Expediently, the step of processing includes employing a narrowband synchronous demodulation for generating a wattless component of a measuring voltage for measuring the distance.

Advantageously, the method further comprises the step of compensating temperature effects and manufacturing tolerances effects of circuit elements on the measuring voltage with the aid of circuit-specific performance characteristics.

The present invention also relates to a sensor for detecting movement parameters of a functional surface to which the sensor is connected relative to a reaction track having profilings. The inventive sensor is primarily characterized by:

At least one measuring coil for detecting a distance to the reaction track;

An alternating current generator for supplying the measuring coil with alternating current, wherein the alternating current produces an alternating field in the measuring coil and wherein the alternating field changes as a function of the distance to the reaction track;

The measuring coil having first strip conductor sections extending in a direction of extension of the profilings in a first plane and second strip conductor sections extending perpendicular to the direction of extension of the profilings in a second plane;

The first and second planes spaced from one another in a direction perpendicular to a longitudinal extension of the reaction track.

Advantageously, the second strip conductor sections are positioned between the reaction track and the first strip conductor sections.

Advantageously, the sensor further comprises connecting conductors, wherein said first strip conductors together with said connecting conductors are positioned in a common plane extending perpendicular to said second plane of said second strip conductor sections.

Preferably, the profilings have repeating sections and the second strip conductor sections are as long as the repeating sections.

Advantageously, the sensor comprises two measuring coils positioned perpendicular to the reaction track one after another and staggered relative to one another such that interference between the two measuring coils is minimized. The measuring coils are preferably staggered by one fourth of their length.

In another embodiment of the present invention the sensor further comprises a detecting coil for determining the velocity of the functional surface relative to the reaction track.

The detecting coil is preferably positioned at a side of the at least one measuring coil facing away from the reaction track.

Preferably, the detecting coil is comprised of two coil sections such that the detecting coil has a high sensitivity with respect to changes of the profilings.

According to the present invention, two signal transmitters arranged within the sensor generate substantially decoupled distance information values. These decoupled distance information values are processed within separate distance measuring channels in order to provide processed signals which are continuously fed into a comparator, whereby the comparator emits a distance information signal only when the processed signals of the separate distance measuring channels are identical within a predetermined tolerance range.

In a preferred embodiment of the present invention it is suggested to feed alternating voltages of different preset frequencies to the signal transmitter coordinated with a respective separate distance measuring channel. The processing of the decoupled distance information values can be performed with a narrowband synchronous demodulation which generates only the wattless component of a measuring voltage for measuring the distance. Thus, any electrical and magnetic interferences which do not fall within the used signal band are greatly dampened with a minimal electronic expenditure.

It is furthermore advantageous to compensate the influence of temperature and manufacturing tolerances of the circuit elements onto the measuring voltage with circuit-specific performance characteristics.

According to the present invention, the inventive sensor comprises a measuring coil for detecting the distance, which measuring coil comprises first strip conductor sections extending substantially parallel to the profilings and furthermore second strip conductor sections which extend substantially transverse to the profilings, whereby the first and second strip conductor sections are not positioned in a common plane so that an offset between the first and second strip conductor sections perpendicular to the reaction track is provided.

For minimizing the interference of the profilings of the reaction track onto the distance determination the second strip conductor sections which extend substantially transverse to the profilings are positioned between the reaction track and the first strip conductor sections which extend substantially in the direction of extension of the profilings. Preferably, the first strip conductor sections together with the connecting conductors extend in a common plane that is positioned at an angle to the second plane of the second strip conductor sections.

It is advantageous with respect to a further reduction of the feedback of the profilings of the reaction track onto the distance information values to provide the second strip conductor sections extending transverse to the direction of extension of profilings with a length that corresponds to the periodic repeating sections of the profilings.

When for a reliable distance determination two measuring coils are being used, they can be positioned, for minimizing their mutual interference; perpendicular to the reaction track one after another and staggered relative to one another. The staggering of the measuring coils is especially advantageous when the offset corresponds to about one fourth of their length.

When it is desired to provide in addition to the determination of the distance also a measuring of the velocity, the sensor is further provided with a detecting coil for determining the velocity of the functional surface relative to the reaction track. This detecting coil is preferably arranged at a side of the distance measuring coils facing away from the reaction track.

In order to ensure high sensitivity with respect to the profile changes of the profilings of the profiled reaction track, the detecting coil for determining the velocity is comprised of two coil sections so that the frequency of the pulse pattern resulting from passing along the track is a measure of the velocity.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 through 4.

Figure 1:
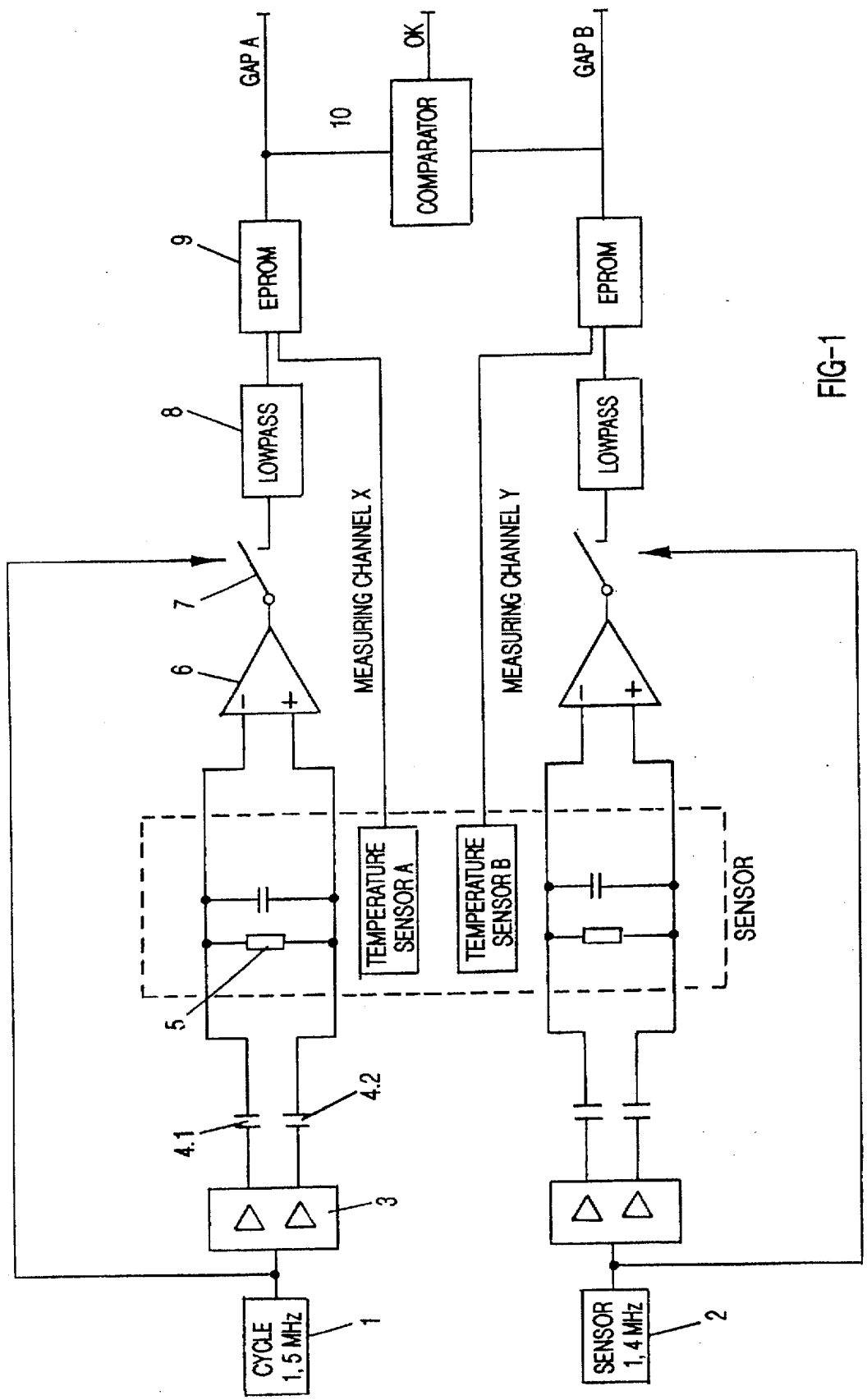
FIG. 1 shows a block diagram for a circuit for performing the inventive method.

When performing the inventive method for reliably determining the distance of the reaction track from the functional surface supporting the sensor, a circuit according to FIG. 1 can be used. According to this circuit, the clock units 1, 2 can be supplied with alternating voltages of different preset frequencies of 1.4, respectively, 1.5 MHz whereby the clock units 1, 2 have coordinated therewith independent measuring channels X, Y of identical design. In the following, the switching circuit of a measuring channel is discussed. The basic clock timing of 1.4 MHz, respectively, 1.5 MHz is transferred by the counter clock driver 3 in two unipolar counterphase signals. After separation of the identical phase of the alternating current with two coupling capacitors 4.1, 4.2, the LC resonance measuring circuit of the sensor containing the measuring coil 5 is symmetrically supplied with these signals. The tapping of the output signal, modulated as a function of the distance based on the interaction with the reaction track, is also carried out symmetrically.

At the input of the subsequently arranged electronic processing unit for the distance information values, the counterphase signals are subtracted in a differential amplifier 6. This allows for suppression of external interference which will cause changes of the same orientation in both signals.

The synchronous demodulation downstream of the differential amplifier is carried out with a switch 7 and a lowpass 8 whereby the produced wattless component of the measuring voltage is supplied in digital form to the input of EPROM 9 for type-specific performance characteristics. The second parameter of the performance characteristics of EPROM 9 is by the temperature at the measuring coil 5. The temperature is determined by a sensor with temperature transmitter A, B in direct vicinity of the respective measuring coil 5. Within the EPROM 9 the respective characteristic lines of the measured wattless component relative to the actually present mechanical gap are saved as a function of the temperature at the measuring coil 5.

Subsequently, the gap signals processed by the two independent measuring channels are checked in comparator 10 operated by a fail-safe technique and their consistency is checked whereby an output signal of the comparator 10 is only emitted when the measuring channels provide identical values.

Due to the completely independent signal paths and the continuous supply of signals by the measuring channels providing the possibility of continuous comparison of the signals with regard to consistency, a safe distance measuring method at any time without interference of the distance information signal during significance checking is possible.

Figure 2:
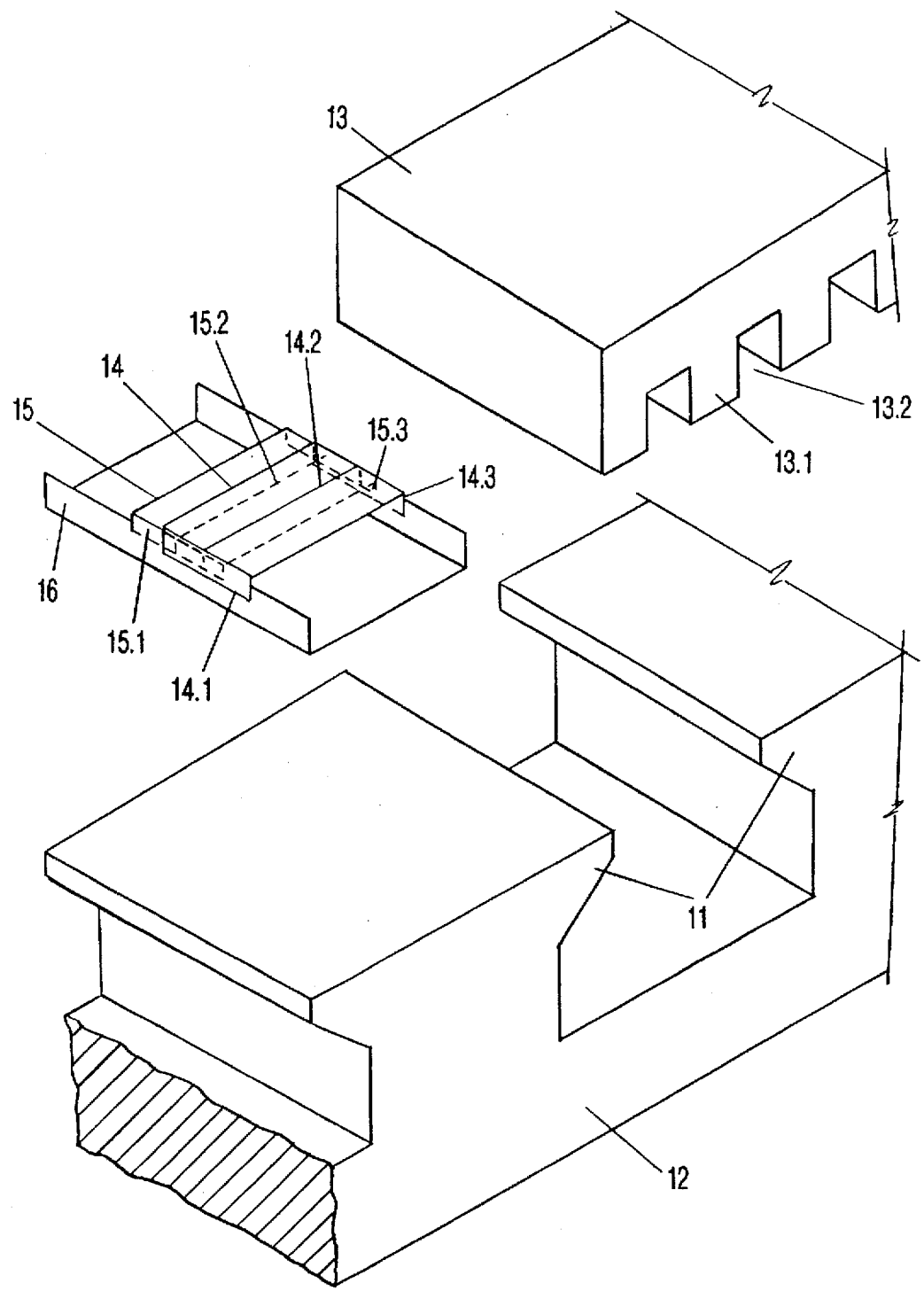
FIG. 2 shows a schematic representation of a sensor with laterally staggered environment of a magnetic leviation vehicle.

A sensor which is designed for mounting within a magnetic levitation vehicle is represented in FIG. 2 with its respective environment. It is mounted between two upright cores 11 of the support magnet 12 of the magnetic levitation vehicle and provides distance information relative to the stator packet 13 provided at the track of the magnetic levitation train, i.e., an information about the size of the gap between the support magnet 12 and the stator packet 13. The stator packet 13 has profilings in the form of teeth 13.1 and grooves 13.2.

Figure 3:
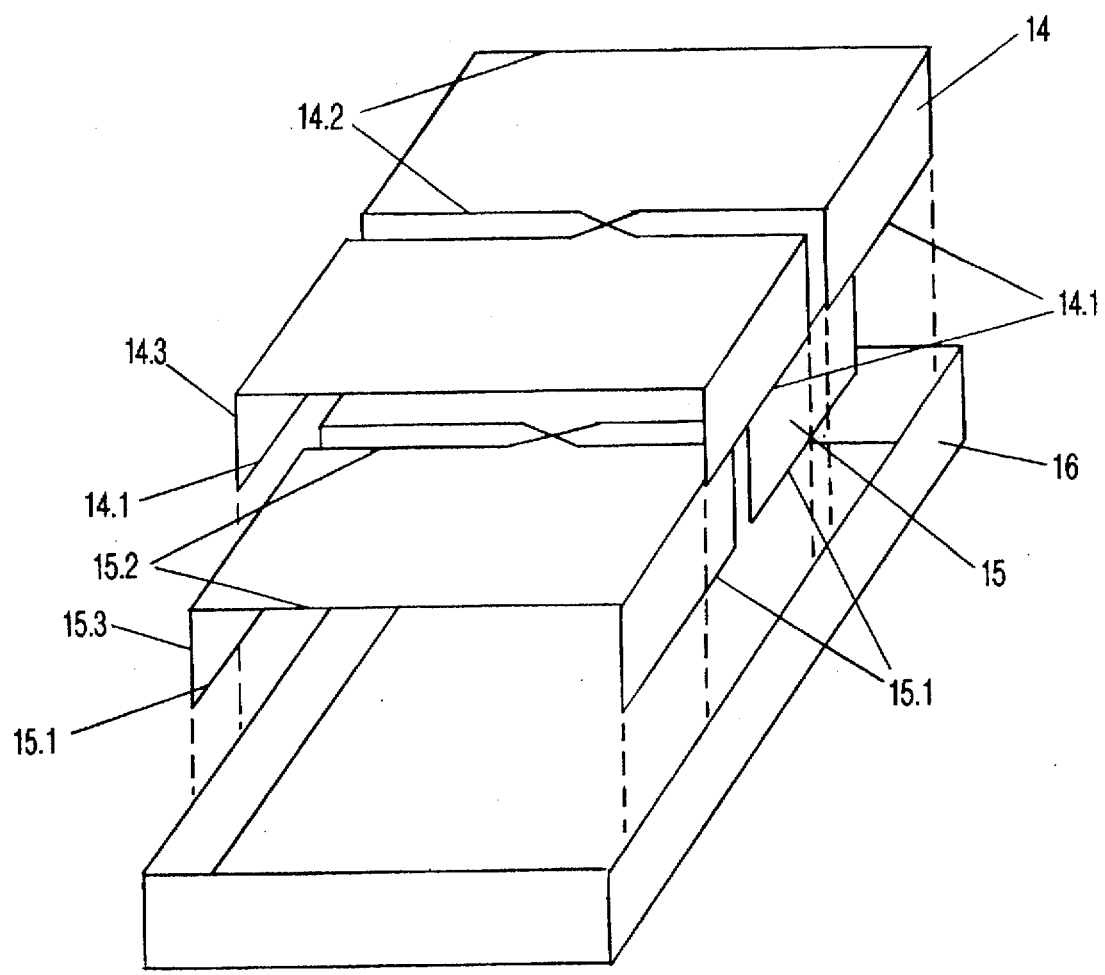
FIG. 3 shows an exploded view of a sensor according to FIG. 2.

As can be seen in the exploded view of the sensor according to FIG. 3, the sensor comprises gap measuring coils 14, 15 of identical design which are arranged in a housing 16 which provides shielding from surrounding magnetic disturbing fields (FIG. 2).

The gap measuring coils 14, 15 are provided with first strip conductor sections 14.1, 15.1 extending substantially in the direction of extension of the profilings and second strip conductor sections 14.2, 15.2 extending substantially transverse to the profilings. The second strip conductor sections, on the one hand, and the first strip conductor sections together with the connecting conductors 14.3, 15.3, on the other hand, are positioned in planes that are at an angle relative to one another. Furthermore, the gap measuring coils 14, 15 extend over the width of a complete tooth-groove-repeating section of a stator packet 13. With such an arrangement the feedback of the tooth-groove-geometry of the longitudinal stator comprised of stator packets 13 onto the measuring signal is minimized. The geometry of the strip conductors of the gap measuring coils 14, 15 is in the shape of a FIG. 8. Thus, the measuring coil is divided into two coil sections with different winding orientation so that the feedback of magnetic disturbing fields onto the measuring signal is suppresesed.

The gap measuring coils 14, 15 are arranged perpendicular to the stator packet 13 one after another and are staggered along the tooth-groove-profiling by one fourth of their length. Such a sensor provides distance information values that are decoupled and are generated by the gap measuring coils 14, 15 which distance information values are processed independently by the disclosed circuit and are then fed to a comparator for comparison.

Figure 4:
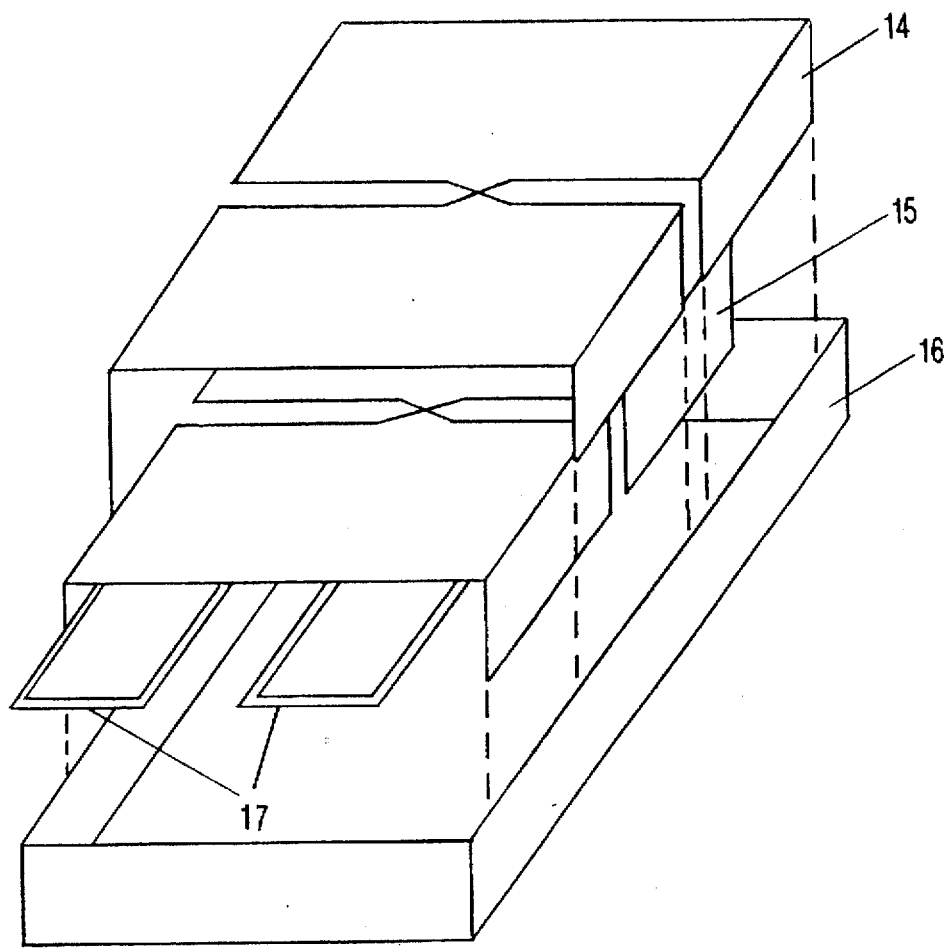
FIG. 4 shows a representation of the sensor according to FIG. 3 with a velocity detecting coil.

The sensor may further comprise a velocity detecting coil 17 comprised of two coil sections which is positioned at the side of the gap measuring coils 14, 15 facing away from the longitudinal stator (FIG. 4). The coil sections are adjusted in their arrangement relative to the tooth-groove-geometry of the longitudinal stator such that a high sensitivity with respect to profile changes can be achieved so that a pulse pattern can be generated that corresponds to the tooth-groove-geometry of the longitudinal stator and the frequency of which is proportional to the velocity of the sensor moved in the longitudinal direction of the longitudinal stator.

The present invention is, of course, in no way restricted to the specific disclosure of the specification and drawings, but also encompasses any modifications within the scope of the appended claims.

What we claim is:

1. A method for measuring a distance between a conducting reaction track and a functional surface moving relative to said reaction track; said method comprising the steps of:

providing a sensor with two signal transmitters on said functional surface and supplying each one of said two signal transmitters with alternating current of a different preset frequency;

generating an alternating field in said sensor, said alternating field changing as a function of the distance between the conducting reaction track and the functional surface;

detecting with each one of said two signal transmitters the changes of said alternating field as distance information;

producing in each of said two signal transmitters decoupled distance information values;

processing the decoupled distance information values in separate distance measuring channels to provide processed signals;

constantly feeding the processed signals to a comparator;

comparing the processed signals in the comparator;

emitting a distance information signal only when the processed signals of the separate distance measuring channels are identical within a predetermined tolerance range.

2. A method according to claim 1, wherein said step of processing includes employing a narrowband synchronous demodulation for generating a wattless component of a measuring voltage for measuring the distance.

3. A method according to claim 1, further comprising the step of compensating temperature effects and manufacturing tolerances effects of circuit elements on a measuring voltage with the aid of circuit-specific performance characteristics.

4. A sensor for detecting movement parameters of a functional surface to which said sensor is connected relative to a reaction track having profilings, said sensor comprising:

at least one measuring coil for detecting a distance to the reaction track;

an alternating current generator for supplying said measuring coil with alternating current, wherein the alternating current produces an alternating field in said measuring coil and wherein the alternating field changes as a function of the distance to the reaction track;

said measuring coil having first strip conductor sections extending in a direction of extension of the profilings in a first plane and second strip conductor sections extending perpendicular to the direction of extension of the profilings in a second plane;

said first and second planes spaced from one another in a direction perpendicular to a longitudinal extension of said reaction track.

5. A sensor according to claim 4, wherein said second strip conductor sections are positioned between the reaction track and said first strip conductor sections.

6. A sensor according to claim 4, further comprising connecting conductors, wherein said first strip conductor sections together with said connecting conductors are positioned in a common plane perpendicular to said second plane of said second strip conductor sections.

7. A sensor according to claim 4, wherein said profilings have repeating sections and wherein said second strip conductor sections are as long as said repeating sections.

8. A sensor according to claim 4, comprising two of said measuring coils positioned perpendicular to the reaction track one after another and staggered relative to one another such that interference between said two measuring coils is minimized.

9. A sensor according to claim 8, wherein said measuring coils are staggered by one fourth of their length.

10. A sensor according to claim 4, further comprising a detecting coil for determining the velocity of the functional surface relative to the reaction track.

11. A sensor according to claim 10, wherein the detecting coil is positioned at a side of said at least one measuring coil facing away from the reaction track.

12. A sensor according to claim 10, wherein said detecting coil is comprised of two coil sections such that said detecting coil has a high sensitivity with respect to changes of the profilings.

* * * * *